United States Patent
Sharma et al.

(10) Patent No.: US 8,982,709 B2
(45) Date of Patent: Mar. 17, 2015

(54) SELECTING SERVICE NODES FOR AN END-TO-END SERVICE PATH FROM A REDUCED SEARCH SPACE

(75) Inventors: Puneet Sharma, Long Beach, CA (US); Manish Jain, Atlanta, GA (US); Sujata Banerjee, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2321 days.

(21) Appl. No.: 11/700,441

(22) Filed: Jan. 31, 2007

(65) Prior Publication Data
US 2008/0181118 A1  Jul. 31, 2008

(51) Int. Cl.
| H04L 12/28 | (2006.01) |
| H04L 12/715 | (2013.01) |
| H04L 29/08 | (2006.01) |
| H04L 12/751 | (2013.01) |
| H04L 12/725 | (2013.01) |
| H04L 12/753 | (2013.01) |

(52) U.S. Cl.
CPC ............... *H04L 67/16* (2013.01); *H04L 45/02* (2013.01); *H04L 45/306* (2013.01); *H04L 45/48* (2013.01); *H04L 45/64* (2013.01)
USPC ........................................... 370/238; 370/351

(58) Field of Classification Search
CPC ........ H04L 45/306; H04L 45/48; H04L 45/64
USPC .................................................... 370/238, 351
See application file for complete search history.

(56) References Cited

U.S. PATENT DOCUMENTS

| 2002/0051449 | A1* | 5/2002 | Iwata | 370/389 |
| 2003/0233640 | A1* | 12/2003 | Reynaud | 717/154 |
| 2006/0094468 | A1* | 5/2006 | Hoshino et al. | 455/561 |
| 2006/0120411 | A1* | 6/2006 | Basu et al. | 370/539 |
| 2006/0271530 | A1* | 11/2006 | Bauer | 707/5 |
| 2008/0181118 | A1* | 7/2008 | Sharma et al. | 370/238 |

* cited by examiner

*Primary Examiner* — Jianye Wu (57) ABSTRACT

Service nodes in a service overlay network are selected to provide a service path for a requested service by determining a reduced search space of service nodes in the service overlay network that are operable to provide service components for the requested service. From the reduced search space of service nodes, service nodes are selected to form a service path that satisfies all quality of service constraints for the service.

20 Claims, 5 Drawing Sheets

SELECTING SERVICE NODES FOR AN END-TO-END SERVICE PATH FROM A REDUCED SEARCH SPACE

BACKGROUND

Overlay networks have been suggested and are starting to be employed as a popular solution to work around rigid and often suboptimal Internet Protocol (IP) routing to provide better performance. Service overlay networking (SON) is an emerging approach for dynamic service composition that employs service nodes that provide more services than just data forwarding. For example, large networks, such as the Internet, provide the infrastructure for many peer-to-peer systems and are now being used to provide a variety of services to users, including Internet applications requiring high bandwidth such as live, high-quality, streaming video, video conferencing, and graphic-intensive multiplayer games.

Several nodes or peers in the network may be able to provide different components of the service, and these nodes and other nodes providing components for services are service nodes forming the SON. For example, for streaming video, one node provides transcoding of the content; another node may provide language translation; etc. There may be multiple nodes that are operable to provide the same components of the services. Service nodes providing different components of the streaming video service are selected and used to provide the streaming video to users.

This process of combining two or more services to provide service to a user is referred to as service composition. In an SON, each service node provides one or more basic services, referred to as component services, in addition to data forwarding. These component-services act as building blocks' for more advanced services, which can be created by combining these component-services in series or in parallel.

One of the problems in SONs is to find a service path, typically comprised of multiple service nodes providing the component services of the desired service and matching user quality of service (QoS) requirements. Overlay networks typically use measurements to infer the network state and to find the path matching QoS requirements for a given application/service. Several techniques and tools are now available to measure the network state. The problem of path selection in overlay networks, then, basically involves finding a path between a source and a destination passing through any intermediate nodes such that it will satisfy one or more QoS requirements.

Prior research proposed using an aggregate QoS constraint and finding the minimum cost path based on the aggregated constraint. The aggregation of QoS constraints, for example, derives a single value representing multiple QoS constraints. The main limitation in the proposed solutions of the prior research is that they aggregate multiple constraints using a linear function, and prior research has shown that the use of a linear function to aggregate multiple constraints might not satisfy all the QoS constraints individually. Thus, such aggregation of QoS requirements cannot guarantee that all QoS constraints are met individually, and important QoS constraints that may severely impact the service, such as delay, may not be met, resulting in poor service quality for the user.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS

In the following detailed description, references are made to the accompanying figures, which illustrate specific embodiments. Changes may be made to the embodiments without departing from the spirit and scope of the embodiments.

SONs typically use measurements to infer the network state and to find a service path matching QoS constraints for a given service. The problem of path selection, then, involves finding a path between a source and a destination passing through any intermediate nodes such that it will satisfy all the QoS constraints. The path selection in SONs have an additional constraint: the path between the source and the destination must pass through a specific set of service service nodes such that all the required component services are covered. This set of service service nodes depends on the user request which determines the sequence of component services (and therefore nodes) that must be selected to satisfy a user request for a service.

According to an embodiment, a heuristic function, K-closest pruning (KCP), is used to solve the problem of multi-constrained service path selection for an SON in polynomial time. The service path selected satisfies all QoS constraints specified by a user or an application. KCP uses a search space reduction metric to identify K-closest nodes for reducing the search space of nodes that can provide the requested service. In one embodiment, delay is the search space reduction metric for determining closeness to a node, but other metrics may be used, such as loss or bandwidth. Identifying K-closest nodes limits the search to service service nodes in close proximity to the current node under consideration in an end-to-end service path.

The KCP proximity-based pruning of the search space achieves the goal of reducing processing time without sacrificing the quality of the results. One advantage of this approach is that it is scalable by reducing the overall search space for service nodes. That is it reduces the number of qualified service nodes/links, for service path selection for a given request. Another advantage is, unlike previous approaches which aggregate multiple QoS constraints into a single constraint, the KCP approach may be performed such that each QoS constraint is considered individually and all the QoS constraints are satisfied. Furthermore, the selection of service nodes to build a service path may be optimized for an objective, such as load balancing or reuse of service nodes.

Figure 1:
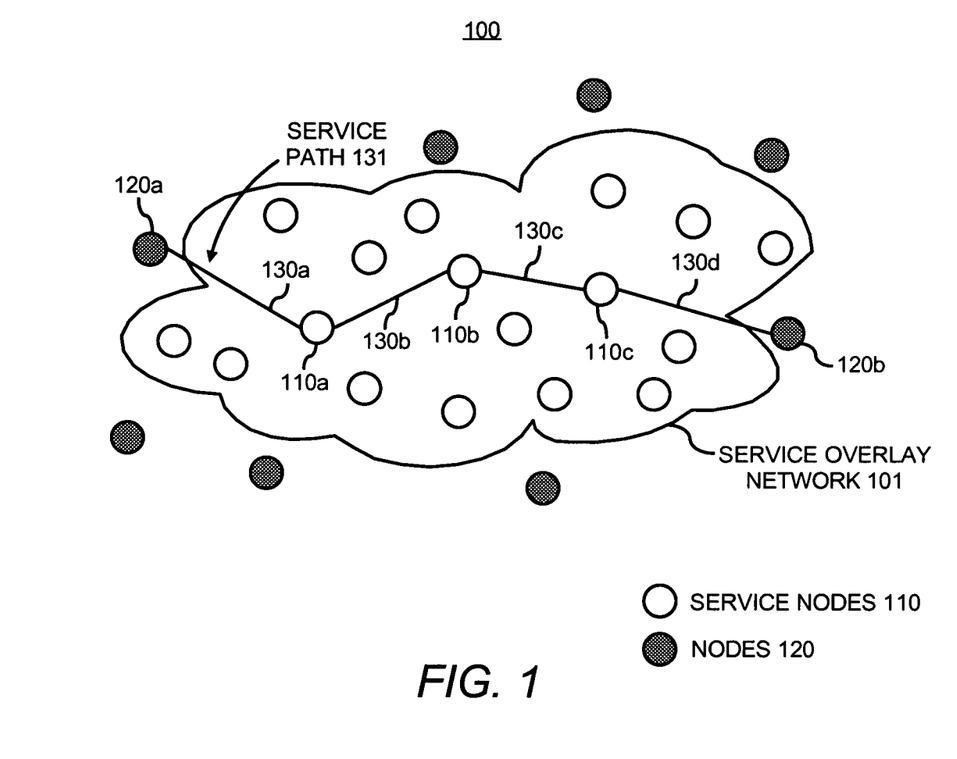
FIG. 1 illustrates a system, according to an embodiment.

FIG. 1 illustrates a system 100, according to an embodiment, including an SON 101. The SON 101 includes service nodes 110. The system 100 may include nodes 120 that are not service nodes. As shown, the nodes 110 and 120 and the SON 101 may be provided in the system 100. The system 100 may include a large-scale network, such as the Internet, that provides the infrastructure for many peer-to-peer networks. However, the embodiments may be implemented in smaller networks.

A node is any device that may send and/or receive messages via a network and that is typically operable to perform some type of data processing. Examples of nodes include routers, servers, and end-user devices, such as personal digital assistants (PDAs), personal computers, laptops, and cellular phones.

The service nodes 110 are operable to forward data in the SON and are operable to perform one or more services. The services may be related to providing requested data in a particular format while satisfying QoS constraints. The services may be component services that are combined with other component services in a particular order to provide a desired service, which may be requested by a user. The nodes 120 may forward data in the network 100, for example, using conventional IP routing. The service nodes 110 are distinguishable from the nodes 120, because the service nodes 110 provide one or more services in addition to forwarding data in the network. Service nodes are also referred to simply as service nodes herein.

The SON 101 is a logical representation of an underlying physical network and includes the service nodes 110. The SON 101 uses the infrastructure of the underlying physical network to perform overlay routing and provide services to users. The service nodes 110 may route data in the SON 101 using an overlay protocol and the virtual overlay links. IP routing may not provide the flexibility for applications/users to select their own paths, and the path provided by IP routing may be sub-optimal. The service nodes 110 may route data flows along links that have better end-to-end performance and that may not normally be selected by conventional IP routing.

The SON 101 may be modeled as the set of service nodes 110 and paths between the service nodes. The paths may include virtual overlay links created, for example, using IP tunnel over an IP network. Link as used herein is an intermediate path in an end-to-end service path between a source and a destination. A link may include two service nodes and a virtual overlay link between the nodes. The link has properties that may be compared to QoS constraints. The link properties may be associated with the virtual overlay link and/or the service nodes. Some examples of link properties associated with the virtual overlay link are loss rate, delay, available bandwidth, and node capacity. Each of the service nodes 110 has resources, including memory and processing capacity. A single metric may be used to represent the capacity of the node resources. For example, the maximum available resource (or node capacity) for a service node is represented by R.

FIG. 1 shows a service path 131 comprised of links 130a-d. A service path includes an end-to-end path between a source and a destination. The service path includes service nodes providing one or more component services. The service path may include multiple links, each forming a portion of the service path. For example, nodes 120a and 110a and the path between nodes 120a and 110a form a link in the service path 131. Links 130b-d are also links in the service path 131 between the source, node 120a, and the destination, node 120b.

In one embodiment, a user request for a service may be received at a service node in the SON 101. Each user request has two parts: a desired service comprising of a sequence of component services and QoS constraints. The service node uses service composition to satisfy the user request. First, each user request is mapped into sequence of component services, which is referred to as a service template. The service template specifies both the type and order of component services necessary to satisfy the user request.

The second step is to map the service template corresponding to the user request to a sequence of replicas. A replica is a copy of a service component that resides on a service node. This may include software and hardware needed to provide the service component. A sequence of replicas providing the component services for the requested service is selected to provide the service and form the service path. Mapping the service template to the sequence of replicas may be performed by a service node receiving the user request, i.e., a distributed mapping service, or may be performed by a central service that receives all user requests for services and maps the requests to a sequence of replicas to form the service path.

In one example, the node 120b requests video content in a particular format and also requests that certain QoS constraints be met for the video content. The service node 110c may receive the request from the node 120b. The service node 110c generates a service template and maps the service template to a sequence of replicas that can provide the service. For example, the source node 120a is identified that can provide the requested content. Also, service nodes 110a and 110b are identified that can provide the content in the desired format while satisfying the QoS constraints. The service nodes 110a and 110b, for example, provide component transcoding services that convert the content to the desired format that is compatible with the node 120b. For example, the service node 110a converts compressed data to a lower bit rate that is compatible with the node 120b and the service node 110b may translate the audio for the content. Other services besides transcoding services may also be provided.

After mapping the service template to a service path, the next step involves creating an active replica instance on the corresponding service node for each overly node providing a component service for the request. A replica on a service node includes the software and hardware needed to provide a component service. The replica may be active or dormant. A replica is active if the component service is currently serving a user request. In other words, the service node has an active instance of a replica if the service node is currently part of a service path corresponding to a previous user request at the time of a new user request arrival needing the same component service. Otherwise, the replica is dormant.

Creating an active replica instance may include configuring software and hardware and/or running the software on the resources to provide the component service. Creating an active replica instance increases a service node's utilization. This increase in utilization is referred to as a service cost. There is a service cost associated with making the replica active.

Service cost depends on whether the replica was active or dormant at the time of receiving the user request. The following example of a web server as a service on a service node explains the difference between active and dormant replica instance. Initially, the web server does not have any child processes running, i.e., the web service is dormant. The web server is considered active as soon as it starts serving a HTTP request and remains active for the duration of HTTP request. The first HTTP request causes the web server process to fork a child process, i.e., become active. Serving any subsequent request's arrival when the web server is active would only require an additional thread. Then, in terms of node utilization, the first user request would increase the utilization by a large amount as compared to any subsequent requests.

Specifically, if the replica is dormant, then the service cost is represented in equation (1) below, where C is the service cost; $O_p$ is a specific service node; and $O_p^i$ is a replica of a service $S_i$ on the service node $O_p$.

$$C(O_p^i)=C(S_i) \quad \text{Equation (1)}$$

Else the service cost is:

$$C(O_p^i)=\beta \times C(S_i), \text{ where } 0\leq\beta\leq 1 \quad \text{Equation (2)}$$

β is referred to as service reuse factor, which determines whether the service is being reused. β=0 implies that an existing active instance of service can be used without increasing the node utilization. On the other hand, β=1 implies that a new service instance needs to be created for each incoming request.

The QoS constraints may include user QoS constraints and service provider QoS constraints. User QoS constraints include any constraints that may be specified directly by the user or be inherent to the desired services. Loss rate ($L^{QoS}$), available bandwidth ($A^{QoS}$), delay ($D^{QoS}$) and node utilization ($U^{QoS}$) are examples QoS constraints for the selection of nodes. Service provider QoS constraints are constraints that may be specified by a service provider.

$D^{QoS}$ and $L^{QoS}$ are additive constraints, which means that the sum of delay or loss rate of all the links in the service path must be smaller than the desired delay or loss rate specified in the user QoS constraints to satisfy the constraints.

On the other hand, the bandwidth ($A^{QoS}$) and the node capacity requirements ($U^{QoS}$) are min-max type of constraints. For example, the user QoS constraints may specify an $A^{QoS}$. Then, in order to satisfy the constraint, the link with the smallest available bandwidth in the service path must be greater than or equal to the specified $A^{QoS}$. Similarly, user QoS constraints may specify a $U^{QoS}$. Then, in order to satisfy the constraint, the service node in the service path with the smallest node utilization must be less than or equal to specified $U^{QoS}$. It should be noted that QoS constraints may vary by link. For instance, the bandwidth requirements for the portion of the path after a transcoding service might be less than those before transcoding. Similarly the node resource requirements of different services might also vary.

Links, including service nodes, for a service path may be selected based on QoS constraints and a predetermined objective of the service provider. Two examples of the objective are load balancing and reuse. For SONs, the goal of load balancing is to distribute the load for a service equally among its replicas. The goal of reuse is to maximize the utility of each active replica for a given service, specially for services with low reuse factor, and thereby minimize the number of active replica's for each type of service. Note that these two constraints are mutually exclusive in nature.

The strategy of instantiating services on new nodes, in the case of load balancing, offers the advantage of faster switchover in case a few nodes fail. Because, a replica may not need to be made active, the switchover is faster. It also reduces the impact of node failures as the requests are distributed over a number of replicas. Also, more replicas would be available for load balancing versus reuse.

The reuse approach, on the other hand, has the advantage of reducing the fragmentation of node resources. The reuse approach is able to satisfy the request by maximizing the utility of active replicas for a given service, and especially for services with low reuse factor.

Two metrics, service path cost (SPC) and service path utilization (SPU), may be used to select a path satisfying either a reuse or a load balancing objective, respectively. For a given user request, several candidate service paths may be identified that satisfy the QoS constraints. Each candidate service path may be represented as P, where the ith candidate service path is $P_i$, which has service nodes $O_f, O_r, \ldots O_y$. The SPC for $P_i$ is the sum of service costs for creating an active replica instance on each of the service nodes $O_f, O_r, \ldots O_y$ in the candidate service path $P_i$. $M_{SPC}(i)$ is the service path cost for the candidate service path $P_i$ and is defined as follows:

$$M_{SPC}(i)=C(O_f^i)+C(O_r^i)+\ldots+C(O_y^i) \quad \text{Equation (3)}$$

$M_{SPC}$ measures the effect of reuse along each node in the candidate service path. According to the reuse constraint, the most suitable service path is the candidate service path with the maximum number of nodes doing reuse. Such a path would have minimal service path cost. The most suitable service path for reuse, $P_{best\ for\ reuse}$, may then be defined as follows:

$$P_{best\ for\ reuse}=kth \text{ candidate service path such that}$$
$$k=\arg\min\{M_{SPC}(k)\} \quad \text{Equation (4)}$$

In general, the smaller the value of Mspc(i), the higher the reuse among service nodes in the corresponding service path.

Similarly, SPU for the candidate service path $P_i$ is the sum of the node utilizations for all the service nodes in the candidate service path. Node utilization increases due to the creation of active replica. $M_{SPU}(i)$ is the service path utilization for the candidate service path $P_i$ and is defined as follows:

$$M_{SPU}(i)=C(O_f)+C(O_r)+\ldots+C(O_y) \quad \text{Equation (5)}$$

SPU quantifies the aggregate load in the service nodes of a service path and can be used to compare the distribution of loads for the candidate service paths. For two paths $P_a$ and $P_b$, a lower value of SPU for $P_a$ relative to $P_b$ indicates that the aggregate load is higher in $P_b$ than in $P_a$. Therefore, $P_a$ is more suitable for a load balancing objective. In general, a path with minimal service path utilization among candidate service paths is the best candidate service path, where:

$$P_{best\ for\ utilization}=kth \text{ candidate service path such that}$$
$$k=\arg\min\{M_{SPU}(k)\} \quad \text{Equation (6)}$$

As described above, after determining the service template, which is the service request mapped into a sequence of component services, the next step is to map the service template to a service path by identifying service nodes hosting or operable to host active replicas that provide the component services for the requested service. Mapping the service template entails searching the service nodes 110 in the SON 101 for replicas that provide the component services for the requested service.

According to an embodiment, the heuristic function, KCP, is used to solve the problem of multi-constrained service path selection for an SON in polynomial time. Using KCP, a reduced search space of service nodes 110 in the SON 101 are identified that can provide the component services. Then, from the reduced search space, candidate service paths are identified that satisfy all the QoS constraints. Then, an objective, such as reuse or load balancing may be used to select a service path from the candidate service paths.

Figure 2:
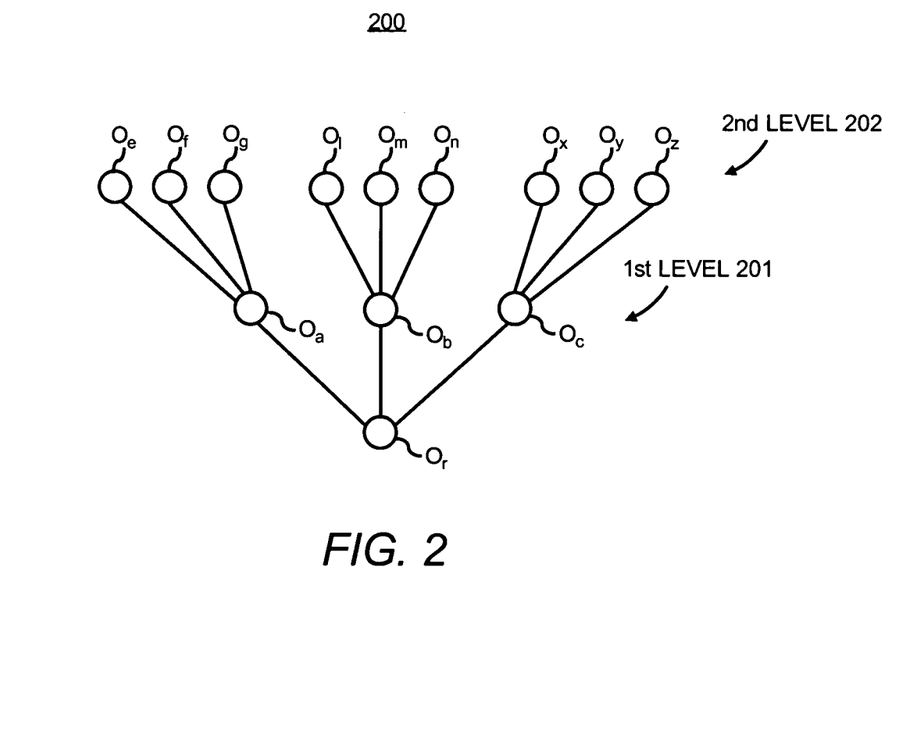
FIGS. 2 and 3 illustrate examples of reduced search spaces, according to embodiments.

The search space includes all the nodes and overlay links in the SON 101. According to an embodiment, the search space is reduced by applying KCP and a search space reduction metric for selecting service nodes for the search space. KCP builds a tree of service nodes, starting from a root node, forming the reduced search space. FIG. 2 illustrates a tree 200 including service nodes from the SON 101 shown in FIG. 1.

The tree 200 includes a root node $O_r$. Suppose a user service request from the node 120b shown in FIG. 1 is received at the service node 110c. The node receiving the service request becomes the last node in the service path. For example, the node 110c becomes the root node $O_r$ and it becomes the last node in any service path that is selected for the user request. A service template is created for the service request, which includes component services in the following sequence: $S_k, S_t$.

Starting from the root node $O_r$, a search space reduction metric is used to identify K-closest nodes in the SON 101 that can provide the service, $S_t$. Closeness, also referred to as proximity, for the K-closest nodes is based on the search space reduction metric. For example, if the search space reduction metric is delay, then the k-closest nodes are a k-number of nodes that have the least delay to the root node $O_r$. The value for "k" may be predetermined and may be based generally on one or more factors, such as the number of service nodes in the SON 101, the maximum desired amount of time to select a service path. etc. Also, many tools are known in the art for gathering measurements for the search space reduction metric. Delay is one example of the search space reduction metric. Other examples include but are not limited to loss rate, available bandwidth, and node capacity.

From the root node $O_r$, KCP forms multiple levels of the tree 200 by iteratively choosing K-closest nodes providing the u–1th service for each node in a current level of the tree 200, and puts the K-closest nodes in the u–(u–1)+1 level of the tree 200, where u represents a number in a sequence of component services in the service template. For example, the service template is $S_k$, $S_t$, represented by $u_1$, and $u_0$, respectively. $u_0$ represents the last service and the levels of the tree 200 are iteratively generated from $u_0$. Any service path must include a service node from each level of the tree.

For example, the tree 200 shows service nodes $O_a$, $O_b$, and $O_c$ in the first level of the tree 201. These nodes, for example, provide the service $S_t$ and are the k-closest nodes to the root node $O_r$. The service nodes $O_a$, $O_b$, and $O_c$ are the children of the root node $O_r$. Then, the k-closest nodes operable to provide the service component $S_k$ are selected for each of the service nodes $O_a$, $O_b$, and $O_c$. These nodes are shown in the second level 202 and include the service nodes $O_{e-g}$, $O_{l-n}$ and $O_{x-z}$ in the SON 101. The service nodes $O_{e-g}$, $O_{l-n}$ and $O_{x-z}$ are the children of service nodes $O_a$, $O_b$, and $O_c$, respectively.

After creating the tree 201, a search is performed to identify the service nodes in the tree that satisfy the QoS constraints for the requested service. A comparison to each of the QoS constraints is performed for service node pairs to identify all the service nodes in the tree 201 that satisfy all the QoS constraints.

In one embodiment, the search includes a depth first search to find all candidate service paths. The candidate service paths must meet all the QoS constraints. For example, the search starts traversing the tree 200 at root node or and proceeds in a depth first manner. Starting at the first level 201, the link properties for the link including $O_a$ and $O_r$ are compared to all the QoS constraints. If the link properties satisfy the QoS constraints, then $O_a$ is included in the tree 200 and then the left first child of $O_a$ is selected if $O_a$ has children. For example, link properties for the link including $O_e$ and $O_a$ are compared to the QoS constraints to determine whether they satisfy all the QoS constraints. A similar comparison and determination is performed for the next child $O_b$ and the next child $O_c$ to determine whether these service nodes should be included in the tree.

If the service node at the first level does not have children or if the QoS comparison and determination have been performed for all the children, then the tree traversal proceeds to the adjacent node in the first level until all the nodes in the first level have been visited. Then, the same procedure is performed for the next level. For example, the next node in the first level 201 is $O_b$, and link properties for the links including $O_r$ and $O_b$ and the links including the children $O_{l-n}$ and $O_b$ are compared to the QoS constraints. Similarly, link properties for the links including $O_r$ and $O_c$ and the links including the children $O_{x-z}$ and $O_c$ are compared to the QoS constraints. Then, the same process is performed for the service nodes in the second level 202.

A link satisfies all the QoS constraints if the aggregated link properties are better than the QoS constraints. The aggregation could be additive, such as for link delays, or the aggregation could be a maximum or a minimum, such as for service capacity. If any link property exceeds the corresponding QoS constraint, then the service path containing such link fails to meet the QoS constraint. Therefore, the search space is reduced by examining all the link properties for the K-closest nodes and eliminating any links that do not meet all QoS constraints.

If a link does not satisfy all the QoS constraints, then the sub-tree above a service node in the link is removed or not included in the tree. For example, if link properties for the link including Or and Oc do not satisfy all the QoS constraints, then the subtree including Oc and all the nodes above Oc and connected to Oc are not included in the tree. Assuming Oc and its children are not included in the tree and some of the links for the children of Oa and Ob are also not included, then the reduced search space may include the tree 300 as shown in FIG. 3.

Figure 3:
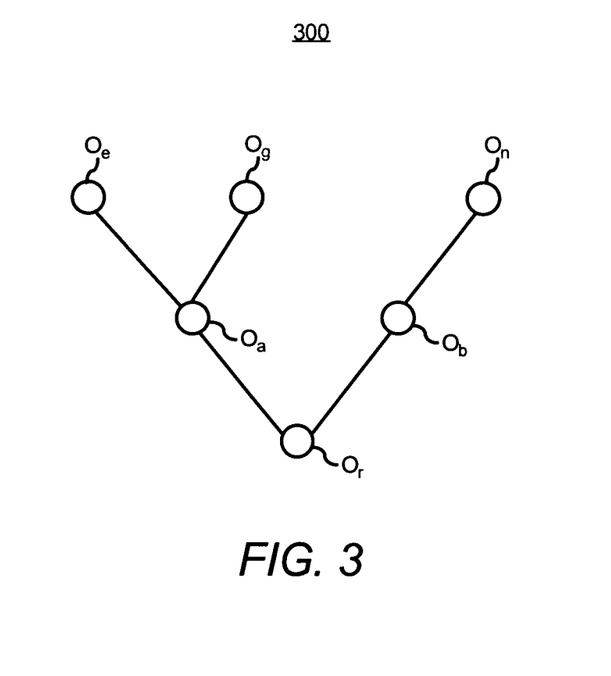

FIG. 3 illustrates a reduced search space comprised of the tree 300 including three candidate service paths. An objective, such as reuse or load balancing may be used to select one of the candidate service paths to use as the service path for the requested service. For example, the candidate service path with the minimum SPU metric or the minimum SPC metric may be selected.

Also, in addition to considering the objective, a candidate service path that is the shortest path may be selected. Shortness may be determined based on a metric, such as delay. In one embodiment, a shortest path is found and then a determination is made whether the shortest path meets all the QoS constraints. The service request is admitted if the shortest path satisfies all the QoS constraints. Otherwise the service request is rejected.

Figure 4:
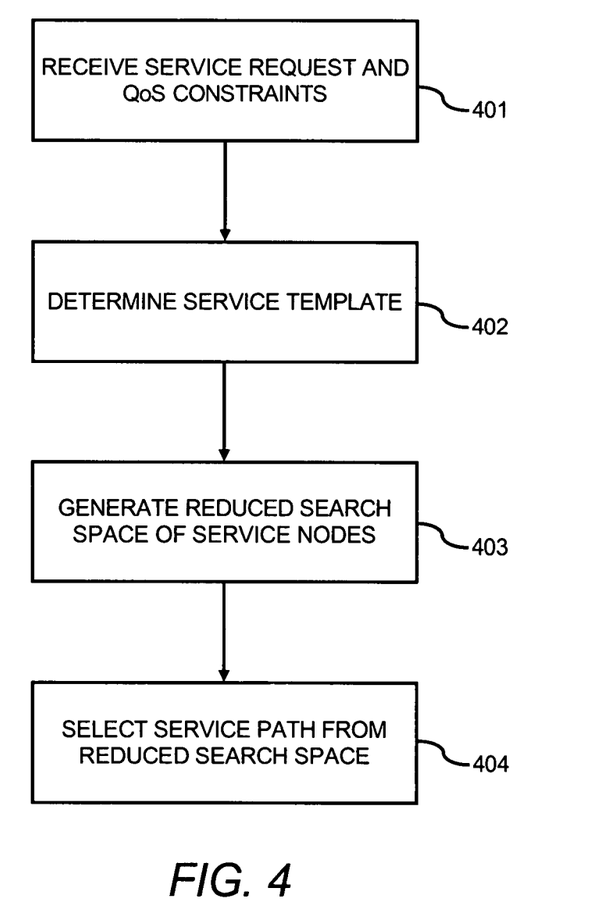
FIG. 4 illustrates a method for selecting a service path, according to an embodiment.

FIG. 4 illustrates a method 400 for selecting a service path in a SON, according to an embodiment. The method 400 is described with respect to FIGS. 1-3 by way of example, and the method 400 may be used in other systems and networks.

At step 401, a service request and QoS constraints for the requested service are received. For example, a service request from the node 120b shown in FIG. 1 is received at the service node 110c. The service node 110c becomes the root node.

At step 402, a service template is determined for the service request. For example, the service node 110c generates a sequence of component services for providing the requested service. The service node 110c may request or periodically receive information from other service nodes in the SON 101 about the component services that may be provided by the service nodes 110 in the SON 101. From that information, the service template is generated. In another embodiment, a central service may be used for receiving all service requests, storing information about services provided and metrics for the service nodes 110 and for generating service templates.

At step 403, a reduced search space of service nodes is generated. Generating the reduced search space may include using the KCP function and a search space reduction metric to iteratively identify sets of K-closest nodes in the SON 101 that may be used in links for candidate service paths. The identified service nodes form a tree, such as shown in FIG. 2 or FIG. 3. The reduced search space includes links that satisfy all the QoS constraints individually. That is each QoS constraint is compared to a corresponding link property for each link. The comparison is performed for all the QoS constraints.

Depth first search may be used to identify candidate links from the sets of K-closest nodes.

At step 404, a service path is selected from the reduced search space. For example, the reduced search space may include multiple candidate service paths, such as shown in FIG. 3. One of the candidate search paths is selected, for example, based on an objective, such as reuse or load balancing.

In another embodiment, the reduced search space is comprised of candidate service paths that provide the shortest path between a source, e.g. the node 120a shown in FIG. 1, and a destination, e.g., the node 120b. Functions for determining the shortest path are known in the art. From the reduced search space, comprised of shortest paths, a service path that meets all the QoS constraints is selected. For example, each QoS constraint is compared to a corresponding link property for each link in each of the shortest paths. One of the shortest paths is selected, for example, based on an objective. If at least one candidate service path is found, the service request is admitted. Otherwise, the service request is rejected.

After the service path is selected, information is sent to each of the service nodes in the service path indicating that the service node is required to provide the component service for the requested service. The service nodes receiving the information either create an active replica from a dormant replica or using an existing active replica to provide the component service.

Figure 5:
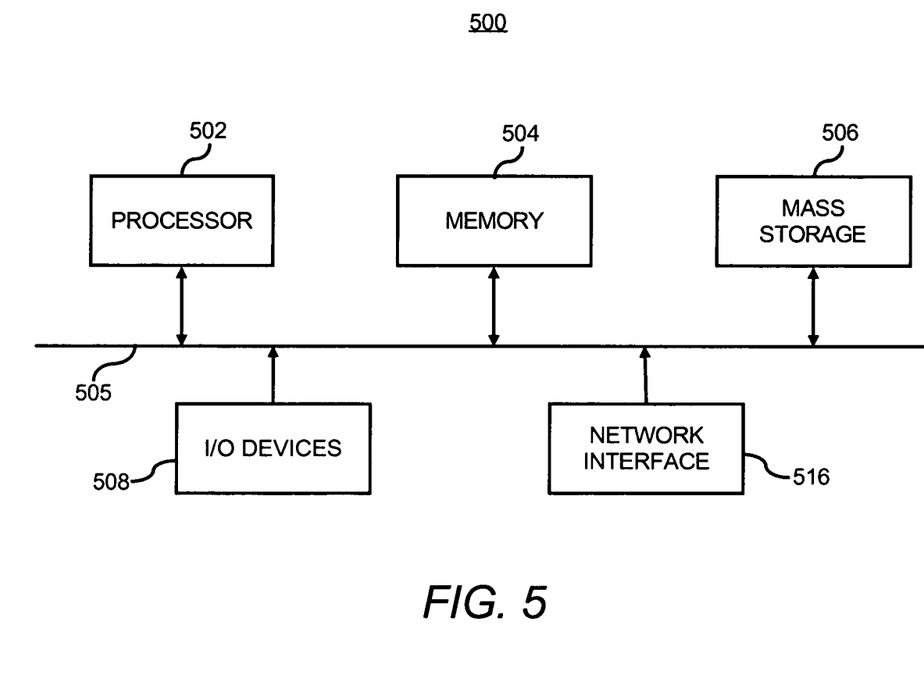
FIG. 5 illustrates a computer system, according to an embodiment.

FIG. 5 illustrates an exemplary block diagram of a computer system 500 that may be used as a node in the SON 101. The computer system 500 includes one or more processors, such as processor 502, providing an execution platform for executing software.

Commands and data from the processor 502 are communicated over a communication bus 505. The computer system 500 also includes a main memory 504, such as a Random Access Memory (RAM), where software may be resident during runtime, and a secondary memory 506. The secondary memory 506 includes, for example, a hard disk drive and/or a removable storage drive, representing a floppy diskette drive, a magnetic tape drive, a compact disk drive, etc., or a nonvolatile memory where a copy of the software may be stored. The secondary memory 506 may also include ROM (read only memory), EPROM (erasable, programmable ROM), EEPROM (electrically erasable, programmable ROM). In addition to software for routing and other steps described herein, routing tables, capacities for overlay paths, available bandwidths for overlay paths, and other data may be stored in the main memory 504 and/or the secondary memory 506.

A user interfaces with the computer system 500 with one or more I/O devices 505, such as a keyboard, a mouse, a stylus, display, and the like. A network interface 516 is provided for communicating with other nodes in the network 100.

One or more of the steps of the method 400 and other steps described herein may be implemented as software embedded on a computer readable medium, such as the memory 504 and/or 506, and executed on the computer system 500, for example, by the processor 502. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the scope of the claimed embodiments.

What is claimed is:

1. A method of selecting service nodes to be used in an end-to-end service path in a service overlay network (SON), the method comprising:
   a computer system determining a search space comprised of service nodes in the SON and determining, from the search space, a reduced search space of service nodes comprised of a subset of the service nodes in the search space in the SON that are operable to provide service components of a requested service and that satisfy a search space reduction metric;
   from the reduced search space of service nodes, selecting service nodes to form a service path that satisfies all quality of service (QoS) constraints individually for the service.

2. The method of claim 1, wherein determining a reduced search space comprises:
   determining the service components and the order of the service components needed to provide the requested service;
   for each of the service components starting from the last service component and proceeding in order to the first service component, iteratively identifying a set of K-closest nodes in the SON that are operable to provide the respective service component, wherein the K-closest nodes is determined using the search space reduction metric.

3. The method of claim 2, wherein iteratively identifying a set of K-closest nodes for each of the service components comprises:
   for the last service component, identifying a set of K-closest service nodes to a root node that are operable to provide the last service component; and
   for each of the remaining service components starting from a next to last service component to the first component and for each of the service nodes in the identified set of K-closest nodes, identifying another set of K-closest nodes operable to provide the respective service component.

4. The method of claim 1, wherein the search space reduction metric is delay.

5. The method of claim 1, wherein the reduced search space forms a tree of sets of K-closest nodes operable to provide the service components for the requested service, and selecting service nodes from the reduced search space to form a service path comprises:
   starting from a root node of the tree, determining link properties for a link between the root node and an intermediate node in a next level of the tree;

comparing the link properties to each of the QoS constraints; and identifying the link as a link for a candidate service path if the link properties satisfy all of the QoS constraints.

6. The method of claim 5, further comprising:

eliminating any links in a subtree for an intermediate node from being in a candidate service path if the link properties do not satisfy all of the QoS constraints; and performing a link properties comparison for each of the QoS constraints for an adjacent intermediate node in the same level to determine whether a link exists for the adjacent intermediate node that satisfies all the QoS constraints.

7. The method of claim 5, further comprising:

if the link satisfies all of the QoS constraints, then identifying a left first child of the intermediate node in a next higher level of the tree;

determining whether a link between the left first child and the intermediate node is a candidate link; and if the intermediate node does not have a child or all the children have been visited, then determining whether a candidate link exists for an adjacent intermediate node in the same level.

8. The method of claim 5, further comprising:

performing the steps of determining link properties, comparing the link properties and identifying links for candidate service paths from the links in the tree; and selecting a candidate service path that best satisfies a predetermined objective associated with use of the service nodes as the service path.

9. The method of claim 1, wherein selecting service nodes from the reduced search space of service nodes to form a service path that satisfies all quality of service (QoS) constraints individually for the service comprises:

eliminating any links that do not satisfy all the QoS constraints; and from the remaining links, identifying candidate service paths; and selecting the service path from the candidate service paths that satisfies a predetermined objective.

10. The method of claim 9, wherein selecting the service path from the candidate service paths that satisfies a predetermined objective comprises:

determining a service path cost for each candidate service path; and selecting the candidate path with a least service path cost if the predetermined objective is to maximize a number of service nodes being reused.

11. The method of claim 10, wherein the service path cost metric is a sum of service cost for creating an active replica instance on all the service nodes in the service path.

12. The method of claim 9, wherein selecting the service path from the candidate service paths that satisfies a predetermined objective comprises:

determining a service path utilization for each candidate service path; and selecting the candidate path with a maximum service path utilization if the predetermined objective is to maximize load balancing among service nodes in the SON.

13. The method of claim 12, wherein service path utilization is a sum of node utilization for all the service nodes in the service path.

14. The method of claim 1, wherein the reduced search space comprises a set of shortest candidate service paths, and selecting service nodes to form a service path comprises:

selecting a candidate service path from the candidate service paths that satisfies all the QoS constraints and that is a shortest path as the service path.

15. A computer program embedded on a computer readable storage device, the computer program including instructions that when executed by a processor implement a method of selecting service nodes to be used in a SON, the method comprising:

determining a search space comprised of service nodes in the SON and determining, from the search space, a reduced search space of service nodes comprised of a subset of the service nodes in the search space in the SON that are operable to provide service components of a requested service and that satisfy a search space reduction metric; and from the reduced search space of service nodes, selecting service nodes to form a service path that satisfies all quality of service (QoS) constraints individually for the service.

16. The computer program of claim 15, wherein determining a reduced search space comprises:

determining the service components and the order of the service components needed to provide the requested service;

for each of the service components starting from the last service component and proceeding in order to the first service component, iteratively identifying a set of K-closest nodes in the SON that are operable to provide the respective service component, wherein the K-closest nodes is determined using the search space reduction metric.

17. The computer program of claim 15, wherein the reduced search space forms a tree, and selecting service nodes from the reduced search space of service nodes to form a service path that satisfies all quality of service (QoS) constraints individually for the service comprises:

performing a depth first search of the tree to identify all the links in the tree that satisfy all the QoS constraints; and from the identified links, identifying candidate service paths; and selecting the service path from the candidate service paths that satisfies a predetermined objective.

18. A node in a network, the node comprising:

data storage storing QoS constraints for a requested service and storing information for service nodes in an SON that form a reduced search space for identifying a service path for the requested service, wherein the reduced search space is a subset of the service nodes in the SON that are identified using a search space reduction metric and that are identified as providing service components of the requested service, and the search space reduction metric is a proximity to a requestor of the service;

a processor configured to select service nodes from the reduced search space to form the service path that satisfies all quality of service (QoS) constraints individually for the service.

19. The node of claim 18, wherein the reduced search space forms a tree, and the processor is configured to perform a depth first search on the tree to identify all the links in the tree that satisfy all the QoS constraints.

20. The node of claim 18, wherein the processor is configured to select candidate service paths from the identified links and select a candidate service path as the service path that best satisfies a predetermined objective associated with use of the service nodes in the service path.

* * * * *